US006773816B2

(12) United States Patent
Tsutsumi (10) Patent No.: US 6,773,816 B2
(45) Date of Patent: Aug. 10, 2004

(54) DRIVING GLASSES (75) Inventor: Takashi Tsutsumi, Osaka (JP)

(73) Assignees: O.M.G. Kabushiki Kaisha, Osaka (JP); Inui Lens Co., Ltd., Osaka (JP)

( * ) Notice: Subject to any disclaimer, the term of this patent is extended or adjusted under 35 U.S.C. 154(b) by 0 days.

(21) Appl. No.: 10/331,966

(22) Filed: Dec. 31, 2002

(65) Prior Publication Data

US 2004/0126590 A1 Jul. 1, 2004

(51) Int. Cl.$^7$ .................. B32B 17/00; C04C 3/068; G02C 7/12
(52) U.S. Cl. ............... 428/428; 428/432; 428/433; 428/697; 428/699; 428/701; 428/702; 501/64; 501/78; 501/152; 351/44; 351/49
(58) Field of Search ............... 428/428, 432, 428/433, 697, 699, 701, 702; 501/55, 64, 65, 73, 77, 78; 351/41, 44

(56) References Cited

U.S. PATENT DOCUMENTS 4,376,829 A * 3/1983 Daiku .................. 501/64
5,135,298 A * 8/1992 Feltman ................ 351/163
6,145,984 A * 11/2000 Farwig .................. 351/49
6,334,680 B1 1/2002 Larson
2001/0044370 A1 * 11/2001 Crane et al. ............ 501/64

FOREIGN PATENT DOCUMENTS

JP       11-281935    * 10/1999
JP     2000-075128 A    3/2000

* cited by examiner

Primary Examiner—Deborah Jones
Assistant Examiner—G. Blackwell-Rudasill
(74) Attorney, Agent, or Firm—Birch, Stewart, Kolasch & Birch, LLP (57) ABSTRACT The invention relates to driving glasses in which a thermic ray reflection layer 2 made of a metal or an organic substance is provided on the outer surface of a glass matrix 1, and an anti-reflection layer 3 is provided on the inner surface thereof, werein the glass matrix 1 contains neodymium oxide $Nd_2O_3$ of 1 through 12% by weight and praseodymium oxide $Pr_6O_{11}$ of 0.5 through 8% by weight, and forms an absorption peak of light transmittance at a wavelength of 510 through 540 nm and a wavelength of 570 through 590 nm.

17 Claims, 7 Drawing Sheets

Fig. 1

2 Thermic ray reflection layer
1 Glass matrix
3 Anti-reflection layer

Fig. 2

2 Thermic ray reflection layer
1 Glass matrix
4 Polarizing film
5 Photo chromic glass
3 Anti-reflection layer

Fig. 3

3 Anti-reflection layer
6 UV-cut glass
4 Polarizing film
1 Glass matrix
3 Anti-reflection layer

Fig. 4

| | $SiO_2$ | $B_2O_3$ | $TiO_2$ | $Na_2O$ | $BaO$ | $ZnO$ | $CuO$ |
|---|---|---|---|---|---|---|---|
| Test Sample 1 (Red·Green: intensified) | 58.4 | 3.9 | | 18.4 | 6.3 | 1.0 | |
| Test Sample 2 (Red: intensified) | 53.00 | 3.90 | 8.20 | 18.40 | 6.28 | | 0.06 |

| | $MnO_2$ | $Fe_2O_3$ | $CeO_2$ | $Nd_2O_3$ | $Pr_6O_{11}$ | $NiO$ | $Sb_2O_3$ |
|---|---|---|---|---|---|---|---|
| Test Sample 1 | | | 0.5 | 6.8 | 4.0 | 0.27 | 0.5 |
| Test Sample 2 | 0.36 | 3.00 | 2.99 | 3.30 | | | 0.50 |

```
A   N   S   I                    Sample-2                                    Z80.3-1996
SAMPLE NAME
SAMPLE THICKNESS                 2.2mm 380nm      0   %        500nm   27.89 %        620nm   62.55 %        740nm   27.66 %
390nm    0.00 %         510nm   28.68 %        630nm   62.69 %        750nm   30.09 %
400nm    0.07 %         520nm   31.80 %        640nm   64.09 %        760nm   50.31 %
410nm    0.49 %         530nm   27.28 %        650nm   64.85 %        770nm   60.69 %
420nm    1.35 %         540nm   41.71 %        660nm   65.22 %        780nm   61.08 %
430nm    2.53 %         550nm   49.19 %        670nm   64.46 %
440nm    4.26 %         560nm   51.46 %        680nm   62.85 %
450nm    6.56 %         570nm   27.76 %        690nm   62.82 %
460nm    9.75 %         580nm   15.03 %        700nm   65.69 %
470nm   13.95 %         590nm   13.00 %        710nm   66.20 %
480nm   18.58 %         600nm   38.18 %        720nm   65.74 %
490nm   24.54 %         610nm   53.91 %        730nm   60.95 %
```

Luminous transmittance                                    35.79 %
UVB transmittance       (illuminanate C)                     0 %
                        ( 290—315nm )
UVA transmittance       ( 315—380nm )                        0 %
500—650nm minimum transmittance                            7.6 %

Traffic signal transmittance    (traffic signals)
                                Red signal                63.33 %
                                Yellow signal             40.38 %
                                Green signal              33.92 %

Chromaticity coordinates        ( D65 )
  YELLOW                                          GREEN
  X sig  417.9628                                 X sig  32.10502
  Y sig  275.9729                                 Y sig  73.4407
  Z sig  0.805466                                 Z sig  26.99694
  x=     0.601609                                 x=     0.242224
  y=     0.397231                                 y=     0.554091

Chromaticity coordinates       ( D65 )
  X D65=  354.2061       Y D65=  377.9626         Z D65=  113.801
  x=      0.418698       y=      0.44678

Fig. 9

DRIVING GLASSES

FIELD OF THE INVENTION

The present invention relates to driving glasses that are favorable if a driver wears the driving glasses while he or she drives a vehicle.

BACKGROUND OF THE INVENTION

Vehicle flow on roads intersecting lengthwise and crosswise are controlled by a traffic signal, and based on the color of a traffic signal, a driver makes a judgement on whether or not he or she must stop the vehicle. Therefore, it is necessary to clearly recognize the color of traffic signals even in the glaring twilight of the evening sun. Accordingly, in order to meet such a need, the present applicant previously proposed driving glasses that suppress the mean transmittance and, at the same time, intensify red (Japanese Unexamined Patent Publication No. 2000-75128).

However, although the driving glasses can clearly recognize the red color of traffic signals even in early morning and twilight, the glasses cannot block out ultraviolet rays reliably nor intensify green in addition to the above feature. Also, in taking other glasses into consideration, there are no glasses that can intensify red and green colors, suppress glare due to reflection waves on a sea surface, and block out thermic rays from the sun. For this reason, for example, a driver is subjected to a hindrance when driving a vehicle along seashores in the summer season.

In addition, if driving glasses that are able to intensify red and green colors, and at the same time, can vary its transmittance in response to the surrounding brightness are achieved, the driving glasses can be adapted and are very effective in a driving environment where a vehicle repeatedly passes through tunnels.

And as a matter of course, it is necessary that the driving glasses meet the standards of the ANSI (American National Standard Institute) Z80.3 as sunglasses. That is, where red is intensified by setting an absorption peak of the light transmittance in the vicinity of 570 nm through 590 nm, if the light transmittance is almost zero in the range as in the characteristics shown in FIG. 6 through FIG. 8 of, for example, the U.S. Pat. No. 6334680, safety is insufficient as driving glasses, and the glasses do not withstand the related laws and regulations in practice. Further, it is necessary that the material of driving glasses is a composition which can be chemically strengthened.

SUMMARY OF THE INVENTION

The invention was developed in view of the above-described problems, and it is therefore an object of the invention to provide driving glasses that are able to clearly recognize green along with red, under the premise of meeting the standards of ANSI Z80.3. Also, it is another object of the invention to provide driving glasses that are able to suppress glare due to reflection waves on a sea surface and block out thermic rays from the sun while the glasses can clearly recognize red and green colors under the premise of meeting the standards of ANSI Z80.3. Also, it is still another object of the invention to provide driving glasses that are able to clearly recognize red, and at the same time, securely block out ultraviolet rays under the premise of meeting the standards of ANSI Z80.3.

In order to achieve the above-described objects, the first aspect of the invention resides in driving glasses having a functional layer or an anti-reflection layer, which are composed of a metal or an organic substance, formed on the outer surface of a glass matrix. The above-described glass matrix contains neodymium oxide $Nd_2O_3$ of 1 through 12% by weight and praseodymium oxide $Pr_6O_{11}$ of 0.5 through 8% by weight, and forms an absorption peak of light transmittance at a wavelength of 510 through 540 nm and a wavelength of 570 through 590 nm. In the present aspect, since the absorption peak of the light transmittance is formed at a wavelength of 510 through 540 nm and a wavelength of 570 through 590 nm, red and green can be clearly recognized. However, according to the composition of the aspect, no adverse effect, by which light transmittance becomes zero at the absorption peak, occurs as in the invention of the U.S. Pat. No. 6,334,680.

The content of neodymium oxide $Nd_2O_3$ is further favorably 3 through 10% by weight, and still further favorably 5 through 7% by weight. Also, the content of praseodymium oxide $Pr_6O_{11}$ is further favorably 1 through 7% by weight, and still further favorably 2 through 5% by weight. And, the content ratio of neodymium oxide $Nd_2O_3$ and praseodymium oxide $Pr_6O_{11}$ is 3:1 through 1:1 as a favorable range, is further favorably 2:1 through 1.5:1 and is optimally 1.75:1 or so. In addition, it is favorable that the total amount thereof is 5 through 15% by weight.

In the aspect, glass-forming oxides such as silicon oxide $SiO_2$ and boron oxide $B_2O_3$, etc., and glass-modifying oxides such as barium oxide BaO, sodium oxide $Na_2O$, potassium oxide $K_2O$, etc., are used, and it is further preferable that a degassing agent such as stibium oxide $Sb_2O_3$ is used. In such a case, the ratio thereof in terms of weight is such that silicon oxide $SiO_2$ is 35 through 70%, boron oxide $B_2O_3$ is 2 through 10%, barium oxide BaO is 2 through 12%, sodium oxide $Na_2O$ is 10 through 25%, and stibium oxide $Sb_2O_3$ is 0 through 1%.

An example of using potassium oxide $K_2O$ is omitted, potassium oxide $K_2O$ may be used instead of sodium oxide $Na_2O$. Further preferably, it is satisfactory that sodium oxide $Na_2O$ and potassium oxide $K_2O$ are concurrently used. In this case, it is favorable that the total amount of sodium oxide $Na_2O$ and potassium oxide $K_2O$ is 10 through 25% by weight.

Also, it is favorable that, as other constituents, zinc oxide ZnO of 0.05 through 3% by weight, cerium oxide $CeO_2$ of 0.1 through 2% by weight, and nickel oxide NiO of 0.05 through 3% by weight are contained.

Also, the second aspect of the invention resides in driving glasses having a functional layer or an anti-reflection layer, which are composed of a metal or an organic substance, formed on the outer surface of a glass matrix. The above-described glass matrix contains neodymium oxide $Nd_2O_3$ of 0.5 through 8% by weight and contains one or more, which is (are) selected from titanium oxide $TiO_2$, iron oxide $Fe_2O_3$ and cerium oxide $CeO_2$, of 1 through 25% by weight as a whole, and suppresses its light transmittance of a wavelength of 400 nm or less substantially to zero, in a glass thickness of 1.75 mm or more, and at the same time, forms an absorption peak of the light transmittance at a wavelength of 510 through 540 nm. In the present aspect, the driving glasses can securely block out ultraviolet rays, and at the same time, clearly recognize red by the absorption peak of the light transmittance of 510 through 540 nm.

In the present aspect, the thicker the glass thickness becomes, the more the light transmittance can be suppressed. However, according to the composition of the invention, no adverse effect, by which the light transmittance becomes zero at the absorption peak, is brought about.

The content ratio of neodymium oxide $Nd_2O_3$ is further favorably 1 through 8% by weight, and still further preferably 2 through 5% by weight. In the invention, it is satisfactory that the content ratio of one or more, which is (are) selected from titanium oxide $TiO_2$, iron oxide $Fe_2O_3$ and cerium oxide $CeO_2$ is 1 through 25% by weight as a whole. However, typically, it is better that all of titanium oxide $TiO_2$, iron oxide $Fe_2O_3$ and cerium oxide $CeO_2$ are contained; and the entire content ratio thereof is 10 through 20% by weight. Also, it is favorable that the content ratios of the respective constituents are 5 through 15% by weight for titanium oxide $TiO_2$, 1 through 6% by weight for iron oxide $Fe_2O_3$ and 1 through 7% by weight for cerium oxide $CeO_2$.

Also, in the invention, usually, glass-forming oxides such as silicon oxide $SiO_2$ and boron oxide $B_2O_3$, etc., and glass-modifying oxides such as barium oxide $BaO$, sodium oxide $Na_2O$, potassium oxide $K_2O$, etc., are used. It is further favorable that a degassing agent such as stibium oxide $Sb_2O_3$, etc., is used. In addition, in such a case, the ratio thereof in terms of weight is such that silicon oxide $SiO_2$ is 35 through 70%, boron oxide $B_2O_3$ is 2 through 10%, barium oxide $BaO$ is 2 through 12%, sodium oxide $Na_2O$ is 10 through 25%, and stibium oxide $Sb_2O_3$ is 0 through 1%. Further, it is favorable that the glass matrix contains, as other constituents, copper oxide $CuO$ of 0.01 through 0.12% by weight, and manganese dioxide $MnO_2$ of 0.1 through 1% by weight.

An example of using potassium oxide $K_2O$ is omitted. However, potassium oxide $K_2O$ may be used instead of sodium oxide $Na_2O$. Further preferably, it is satisfactory that sodium oxide $Na_2O$ and potassium oxide $K_2O$ are concurrently used. In this case, it is favorable that the total amount of sodium oxide $Na_2O$ and potassium oxide $K_2O$ is 10 through 25% by weight.

In both the above-described first and second aspects, not only a common anti-reflection layer but also a thermic ray reflection layer for reflecting thermic rays are preferably selected. Herein, a metal layer and an organic substance layer may be considered as the thermic ray layer. Preferably, an aluminum-deposited layer is illustrated. An evaporation layer of ITO (indium tin oxide) may be acceptable. Also, in both the first and second aspects, preferably, an anti-reflection layer is formed on the inner surface of the glass matrix. In this case, eyeball reflection onto the inner surface of glass can be prevented.

The third aspect of the invention resides in driving glasses having a polarizing film provided on the inner surface or the outer surface of a glass matrix. The above-described glass matrix contains neodymium oxide $Nd_2O_3$ of 1 through 12% by weight and praseodymium oxide $Pr_6O_{11}$ of 0.5 through 8% by weight, and forms an absorption peak of light transmittance at a wavelength of 510 through 540 nm and a wavelength of 570 through 590 nm. The fourth aspect of the invention resides in driving glasses having a polarizing film provided on the inner surface or the outer surface of a glass matrix. The glass matrix contains neodymium oxide $Nd_2O_3$ of 0.5 through 8% by weight and contains one or more, which is (are) selected from titanium oxide $TiO_2$, iron oxide $Fe_2O_3$ and cerium oxide $CeO_2$, of 1 through 25% by weight as a whole, and suppresses its light transmittance of a wavelength of 400 nm or less substantially to zero, in a glass thickness of 2 mm, and at the same time, forms an absorption peak of the light transmittance at a wavelength of 510 through 540 nm.

The third and fourth aspects of the invention are featured in providing a polarizing film. However, herein, the polarizing film means that it permits an incident light beam having only a direction constituent coincident with a specified polarization angle to pass through with respect to incident light beams having an inclination constituent of 360°. Such a structure of placing a polarizing film between a glass matrix according to the invention and UV-cut glass may be illustrated as a preferable example. Since the third and fourth aspects of the invention have a polarizing film, it is possible to suppress glaring reflection light on a water surface or a snow and ice surface, wherein it is possible to securely prevent eyeball fatigue reliably.

Also, in the third aspect of the invention, preferably, photo chromic glass, in which the light transmittance automatically varies corresponding to irradiation of ultrasonic rays, is provided continuously from the above-described polarizing film. This feature is identical to that of the fourth aspect of the invention. However, also, in the case of the fourth aspect, it is favorable that a photo chromic glass, in which the amount of light transmission automatically changes in response to irradiation of light at the short-wavelength side of a visible range, is provided continuously from the above-described polarizing film.

The photo chromic glass is made into a dark color when it is exposed to ultraviolet rays and light at the short wavelength side of a visible range and is restored to its original state when the irradiated ray is eliminated. The photo chromic glass originates in that described in, for example, U.S. Pat. No. 3,208,860. Such photo chromic glass is typically produced by developing crystallite of silver halide, which is selected from a group of AgCl, AgBr, and AgI. According to U.S. Pat. No. 3,208,860, favorable base glass is oriented in a composition of $R_2O$—$Al_2O_3$—$B_2O_3$—$SiO_2$.

In any case, where photo chromic glass is provided continuously from the above-described polarizing film, there are advantages in clear recognition of red and green and in changes in the light transmittance of driving glasses in response to surrounding brightness. Although, with the present embodiment, it is necessary to make the glass matrix thin and to increase the mean transmittance, it is favorable in view of driving glasses being made equivalently thin. In addition, in connection with the embodiment in which photo chromic glass is provided, the third embodiment is further preferable than the fourth embodiment in view of setting the light transmittance higher.

Other and further objects, features and advantages of the invention will appear more fully from the following description. It is to be expressly understood, however, that the drawings are for the purpose of illustration only and are not intended as a definition of the limits of the invention.

DETAILED DESCRIPTION OF THE INVENTION

Figure 1:
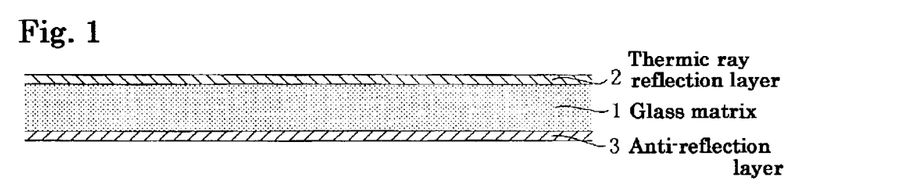
FIG. 1 is a view describing the sectional construction of driving glasses according to the first embodiment.

FIG. 1 illustrates the sectional construction of driving glasses that are able to effectively reflect thermic rays along with intensifying red. As shown in the drawing, the driving glasses are constructed by providing a thermic ray reflection layer 2 for reflecting thermic rays on the outer surface side of a glass matrix 1 and at the same time providing an anti-reflection layer 3 on the inner surface side of the glass matrix 1. As has been made clear, the anti-reflection layer 3 is formed on the inner surface that approaches the eyeballs, and the thermic ray reflection layer 2 is formed on the outer surface oriented from the eyeballs to the field of vision.

The thermic ray reflection layer 2 is not specially limited as far as reflecting infrared rays. Therefore, the layer may be made of a metal or an organic substance. However, typically, the layer is formed by depositing aluminum or ITO. Also, the material of the anti-reflection layer 3 is not specially limited. If the anti-reflection layer 3 is deposited, a reflection light oriented toward the eyeballs can be prevented, and reflection of the eyeballs of a glasses wearer onto the glasses can be prevented. Further, a general anti-reflection layer 3 may be provided instead of the thermic ray reflection layer 2.

Figure 4:
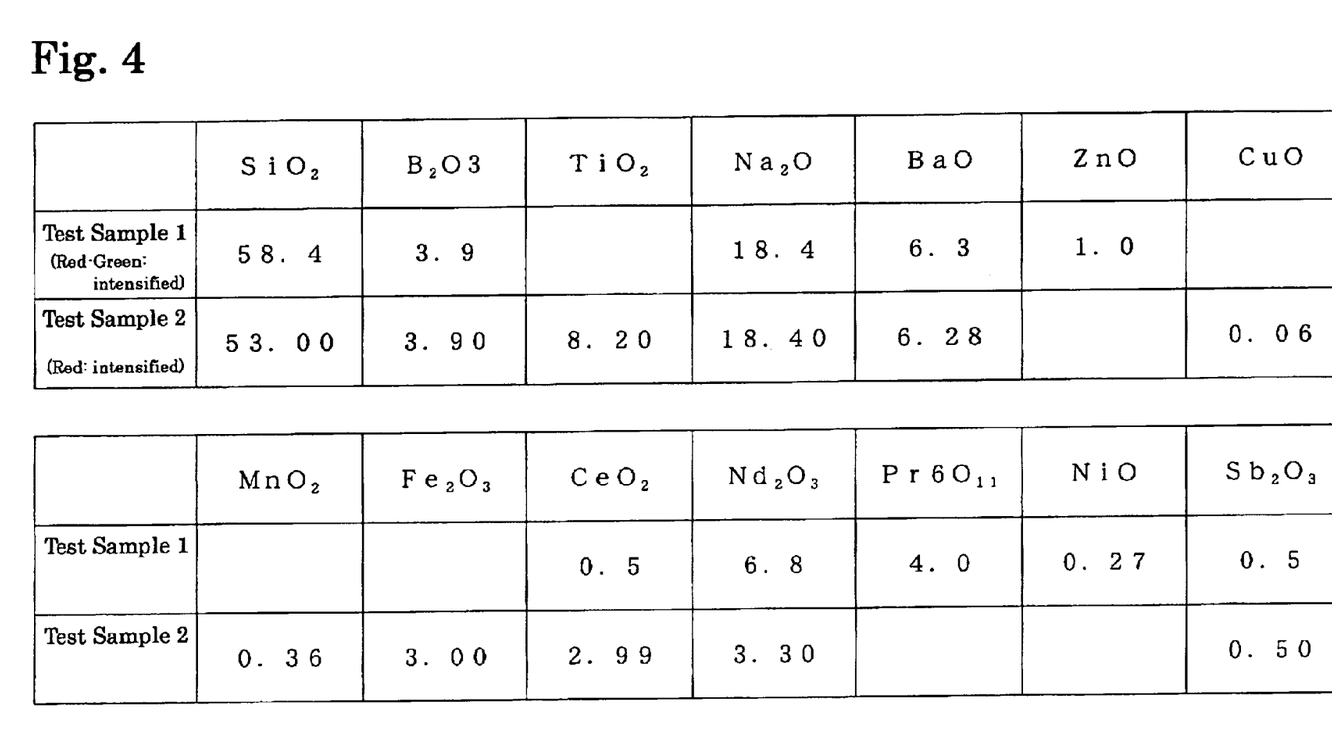
FIG. 4 is a view showing the compositions of glass matrices (Test Sample 1 and Test Sample 2) used for the embodiments.
Figure 5:
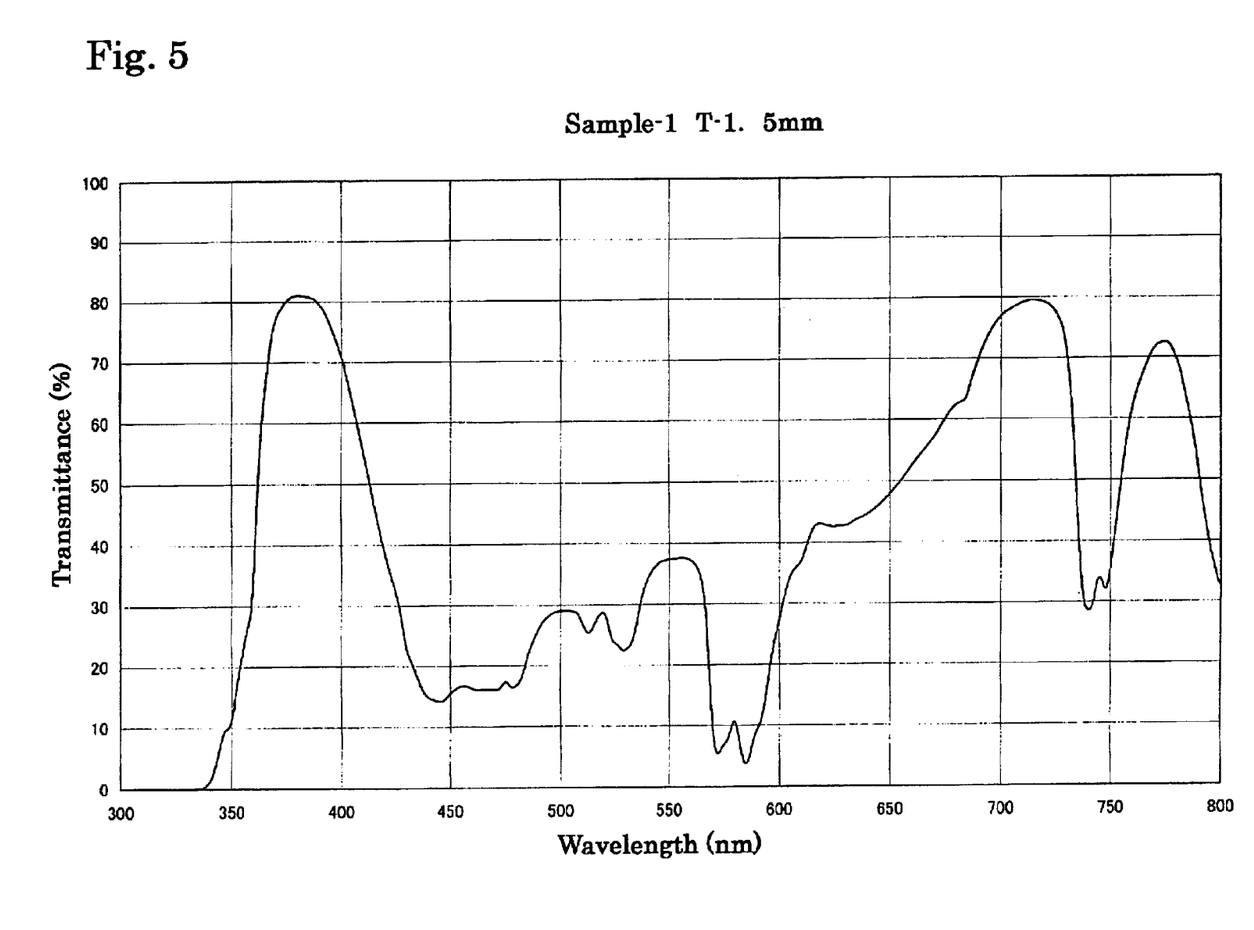
FIG. 5 is a spectral transmittance curve showing a spectral transmittance of Test Sample 1.

FIG. 4 is a table of compositions of Test Sample 1 and Test Sample 2, which are favorable as the glass matrix 1. FIG. 5 is a spectral transmittance curve showing a spectral transmittance of Test Sample 1 whose thickness is polished to be 1.5 mm thick, and FIG. 6 is a view showing the characteristics of Test Sample 1, which are measured in compliance with the requirements of ANSI.

Since the glass matrix 1 contains neodymium oxide $Nd_2O_3$ of 6.8% by weight and praseodymium oxide $Pr_6O_{11}$ of 4% by weight, it becomes possible to obtain the three-color spectral characteristics shown in FIG. 5. That is, red in which a sharp absorption peak is formed in the vicinity of a wavelength of 570 through 590 nm is intensified. Also, green is also intensified by an absorption peak in the vicinity of a wavelength of 510 through 540 nm, wherein clear contrasts in connection with red, green and yellow of traffic signals can be achieved.

Figure 6:
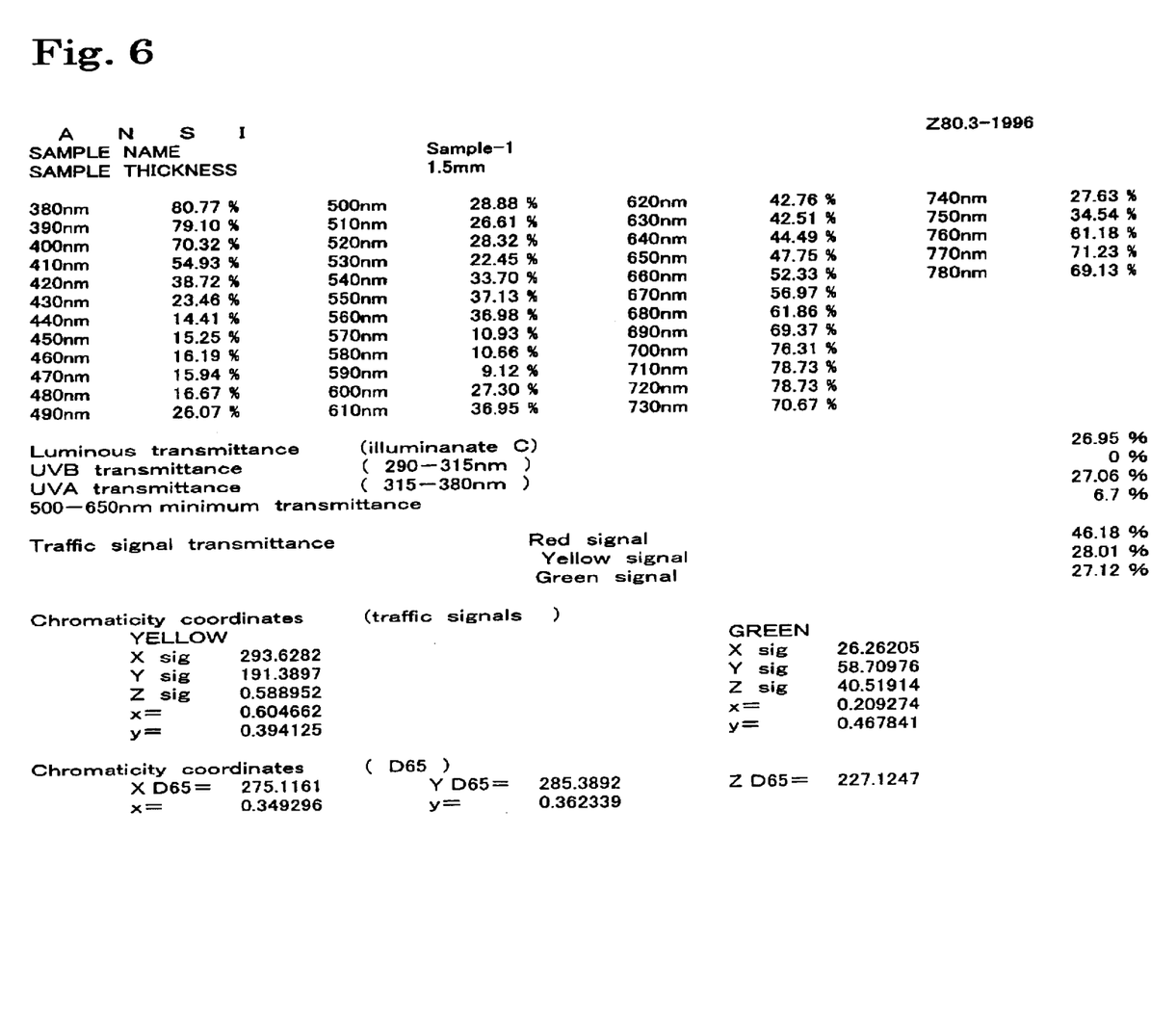
FIG. 6 is a view illustrating the characteristics of Test Sample 1 that is polished to be 1.5 mm thick.

Although Test Sample 1 has a sufficient light blocking effect in a state where it is polished to be 1.5 mm thick, as shown in FIG. 6, the minimum value of the light transmittance in a range of 500 through 590 nm is 6.7%. Therefore, Test Sample 1 is applicable for use as driving glasses. Also, although, according to ANSI Z80.3, the luminous transmittance requested for a general purpose lens is regulated to be 8 through 40%, the luminous transmittance of Test Sample 1 is 26.95%, wherein even if the thermic ray reflection layer 2 and anti-reflection layer 3 are provided, Test Sample 1 can meet the requirements of ANSI. Herein, the luminous transmittance is defined as described below.

Luminous transmittance is a function of the spectral transmittance of the lens weighted by the corresponding ordinates of the photopic luminous efficiency distribution of the CIE (1931) standard colorimetric observer and by the spectral intensity of standard illuminant C. The luminous transmittance ($\tau v$) of a lens is expressed mathematically as follows:

$$\tau_v = \frac{\int_{380}^{780} \tau(\lambda) V(\lambda) Sc(\lambda) d\lambda}{\int_{380}^{780} V(\lambda) Sc(\lambda) d\lambda}$$

Where:
$\tau(\lambda)$=is the spectral transmittance of the lens; $V(\lambda)$=is the spectral ordinate of the photopic luminous efficiency distribution [$y(\lambda)$] of the CIE (1931) standard calorimetric observer; and $Sc(\lambda)$=is the spectral intensity of standard illuminant C.

And, according to ANSI, it is regulated that the traffic signal transmittance is 8% or more for a red signal, 6% or more for a yellow signal, and 6% or more for a green signal. The mean transmittance is also regulated therein with respect to the UVB (Ultraviolet-B) region (290 through 315 nm) and UVA (Ultraviolet-A) region (315 through 380 nm). However, as shown in FIG. 6, Test Sample 1 that is polished to be 1.5 mm thick is sufficiently beyond these conditions, wherein even if a thermic ray reflection layer 2 and an anti-reflection layer 3 are provided, it is possible to meet the standards of ANSI. Further, the composition ensures chemical strength. Therefore, the composition meets all practical conditions as driving glasses.

Figure 7:
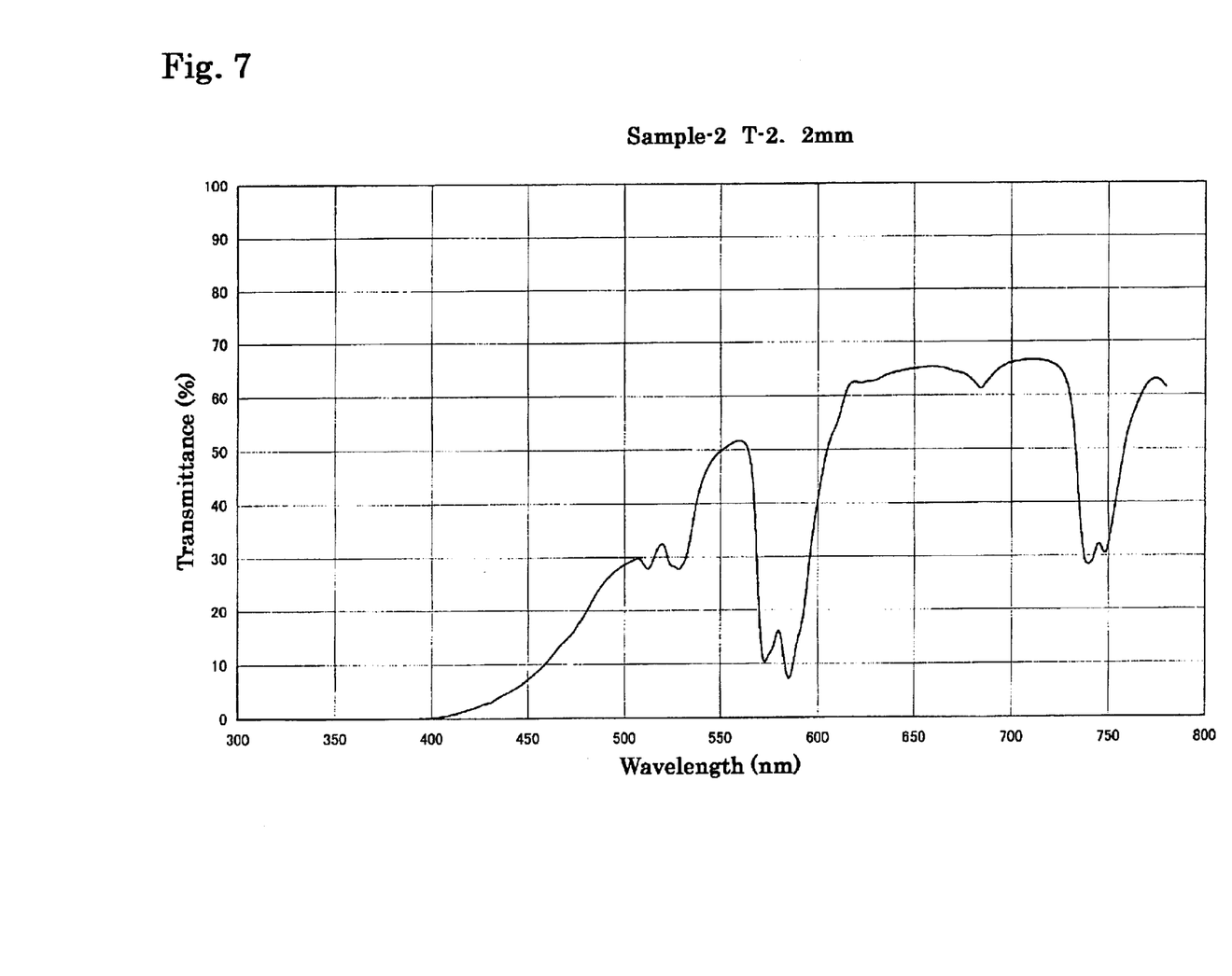
FIG. 7 is a spectral transmittance curve showing a spectral transmittance of Test Sample 2.
Figure 8:
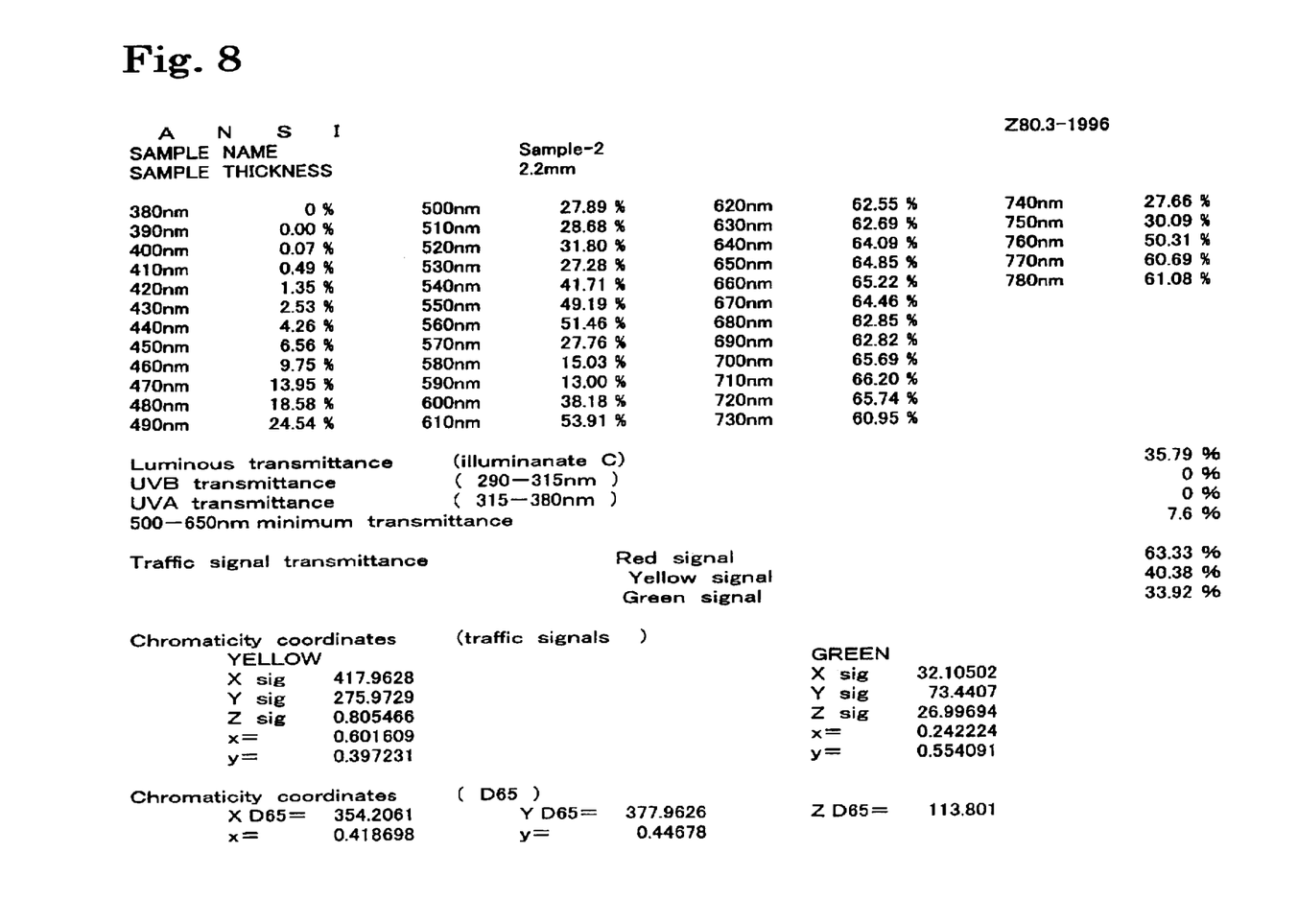
FIG. 8 is a view illustrating the characteristics of Test Sample 2 that is polished to be 2.2 mm thick.

FIG. 7 illustrates a spectral transmittance curve in the case where Test Sample 2 having a composition shown in FIG. 4 is polished to be 2.2 mm thick. Also, FIG. 8 illustrates measurement results of the characteristics required by ANSI with respect to Test Sample 2.

Since Test Sample 2 characteristically contains titanium oxide $TiO_2$ of 8.20% by weight, iron oxide $Fe_2O_3$ of 3.00% by weight, and cerium oxide $CeO_2$ of 2.99% by weight, the test sample suppresses the transmittance to zero at a wavelength of 400 nm, and an ultraviolet ray blocking out effect can be securely brought about.

Also, in the case of Test Sample 2, a sharp absorption peak appears in the vicinity of 570 through 590 nm since neodymium oxide $Nd_2O_3$ is contained at 3.3% by weight, wherein red is intensified. And, the transmittance is maximized in the vicinity of 620 nm, the transmittance is set to be slightly lower than the above in the vicinity of 550 through 560 nm, and the transmittance is made further lower than in the vicinity of 420 nm. Therefore, in compliance with the importance of colors of traffic signals, red is most intensified, and yellow is next intensified, wherein the contrasts among colors are clearly achieved.

Also, Test Sample 2 can meet, with sufficient allowance, the requirements of ANSI with respect to the luminous transmittance, traffic signal transmittance, and mean transmittance in the UVB (Ultraviolet-B) region (290–315 nm) and UVA (Ultraviolet-A) region (315–380 nm), wherein even if a thermic ray reflection layer 2 and an anti-reflection layer 3 are provided, driving glasses that can meet the standards of ANSI can be brought about. And, the material of the driving glasses is a composition which can be chemically strengthened.

Figure 2:
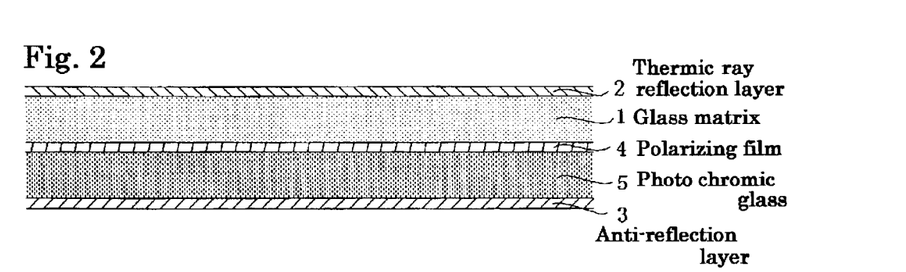
FIG. 2 is a view describing the sectional construction of driving glasses according to the second embodiment.

FIG. 2 shows an embodiment in which a polarizing film 4 and photo chromic glass 5 are provided on the rear side of a glass matrix 1 similar to that of FIG. 1, and an anti-reflection layer 3 is provided in the vicinity of the eyeballs. However, since the photo chromic glass 5 is used in the driving glasses in FIG. 2, it is necessary to transmit ultraviolet rays, and since it is not necessary that the mean transmittance is excessively lowered, a thinly polished Test Sample 1 shown in FIG. 4 may be favorably used. However, if the light transmittance is increased by further thinly polishing Test Sample 2 and a photo chromic glass 5 that is reacted by light at the short wavelength side of the visible range is used, it is possible to produce driving glasses in FIG. 2 using Test Sample 2.

The polarizing film 4 in FIG. 2 is not specially limited if it has such a feature as can transmit light only in the polarization plane in a specified direction. However, according to the results of the polarization characteristics, it is possible to clearly recognize traffic signals through the driving glasses, and at the same time, it is possible to securely suppress [glare] such as reflection light from a sea surface, etc. Further, the polarizing film 4 and glass matrix 1 are adhered to each other and combined together.

In addition, the photo chromic glass 5 in FIG. 2 has a feature by which the same is turned dark through reaction with ultraviolet rays and light at the short wavelength side of the visible range by containing silver Ag, copper Cu and other halite substances. Since the driving glasses shown in FIG. 2 are provided with such photo chromic glass 5, it is possible to vary the transmittance as a whole in response to brightness outdoors.

Figure 3:
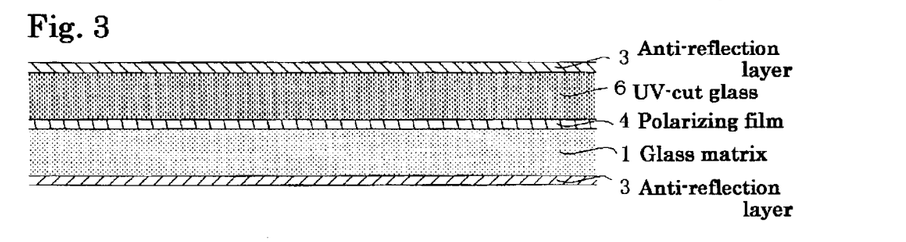
FIG. 3 is a view describing the sectional construction of driving glasses according to the third embodiment.

FIG. 3 shows an embodiment in which UV-cut glass 6 and glass matrix 1 of Test Sample 1 are provided on both sides of the polarizing film 4. Also, the UV-cut glass 6 is not specially limited if it blocks out ultraviolet rays while it permits light in the visible range to pass through, wherein publicly known UV-cut glass may be used.

Figure 9:
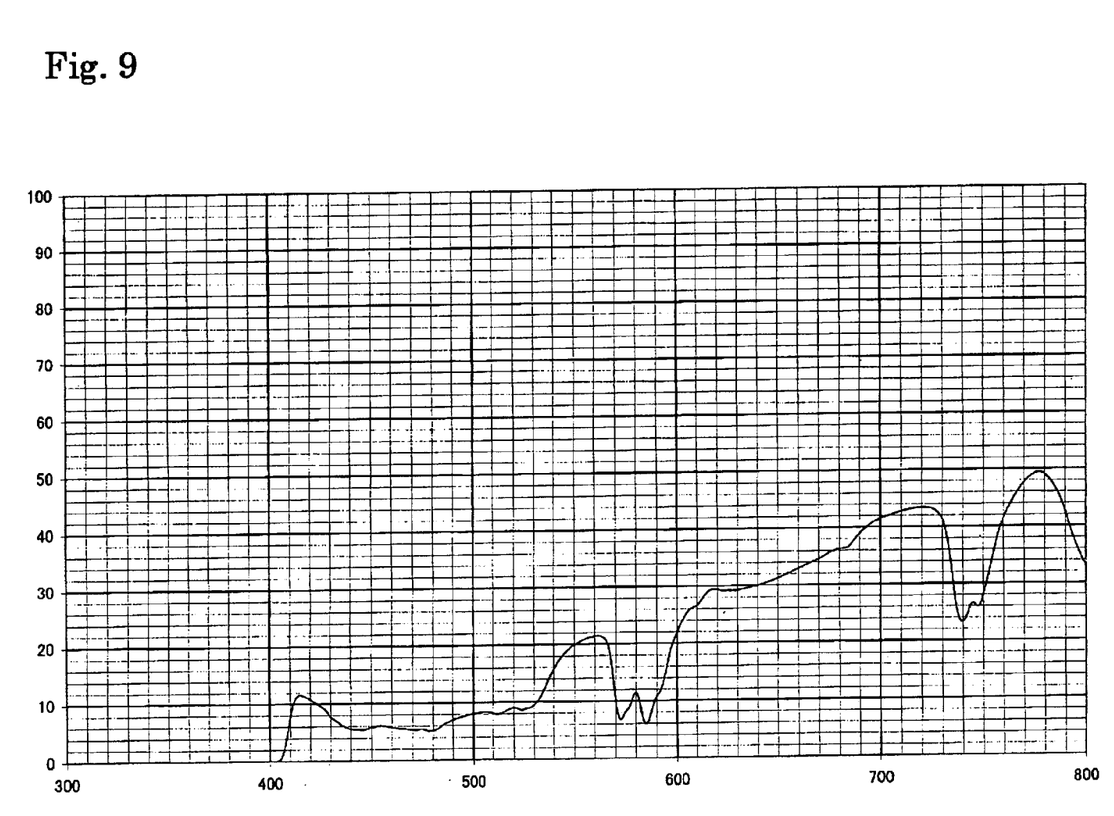
FIG. 9 is a view showing the spectral transmittance of driving glasses according to the third embodiment.

FIG. 9 is a view showing the spectral transmittance curve of driving glasses shown in FIG. 3. As shown in the drawing, ultraviolet rays can be completely blocked out, and at the same time, the driving glasses have a three-color spectral feature similar to FIG. 5, wherein the contrasts among red, green and yellow can be clearly recognized. In addition, although not being illustrated, it is confirmed that the driving glasses in Embodiment 3 meet all of the requirements of ANSI.

As described above, a detailed description was given of the embodiments of the invention. Various modifications and variations are enabled without departing from the purpose of the invention. It is further understood by those skilled in the art that the foregoing descriptions are preferred embodiments and that various changes and modifications may be made without departing from the spirit and scope thereof.

What is claimed is:

1. Driving glasses meeting the standards of ANSI Z80.3 and having a functional layer or an anti-reflection layer, which are composed of a metal or an organic substance, formed on the outer surface of a glass matrix,
    wherein said glass matrix contains neodymium oxide and praseodymium oxide, the content ratio of neodymium oxide and praseodymium oxide is 3:1 through 1:1 as a range, and a total amount thereof is 5 through 15% by weight,
    and forms an absorption peak of light transmittance at a wavelength of 510 through 540 nm and a wavelength of 570 through 590 nm.

2. Driving glasses meeting the standards of ANSI Z80.3 and having a functional layer or an anti-reflection layer, which are composed of a metal or an organic substance, formed on the outer surface of a glass matrix,
    wherein said glass matrix contains neodymium oxide of 0.5 through 8%, titanium oxide of 5 through 15%, iron oxide of 1 through 6%, and cerium oxide of 1 through 7%, and a total amount of the last three components is 10 through 20%, all by weight,
    and suppresses its light transmittance of a wavelength of 400 nm or less substantially to zero, in a glass thickness of 2 mm or more, and at the same time, forms an absorption peak of the light transmittance at a wavelength of 510 through 540 nm.

3. The driving glasses as set forth in claim 1, wherein said functional layer displays a function of reflecting thermic rays.

4. The driving glasses as set forth in claim 1, wherein an anti-reflection layer is formed on the inner surface of said glass matrix.

5. Driving glasses meeting the standards of ANSI Z80.3 and having a polarizing film provided on the inner surface or the outer surface of a glass matrix,
    wherein said glass matrix contains neodymium oxide and praseodymium oxide, the content ratio of neodymium oxide and praseodymium oxide is 3:1 through 1:1 as a range, and a total amount thereof is 5 through 15% by weight,
    and forms an absorption peak of light transmittance at a wavelength of 510 through 540 nm and a wavelength of 570 through 590 nm.

6. The driving glasses as set forth in claim 5,
    wherein a photo chromic portion whose light transmittance automatically varies in response to irradiation of an ultraviolet ray is provided continuously from said polarizing film.

7. The driving glasses as set forth in claim 5,
    wherein UV-cut glass for blocking out ultraviolet rays is provided continuously from said polarizing film.

8. Driving glasses meeting the standards of ANSI Z80.3 and having a polarizing film provided on the inner surface or the outer surface of a glass matrix,
    wherein said glass matrix contains neodymium oxide of 0.5 through 8%, titanium oxide of 5 through 15%, iron oxide of 1 through 6% and cerium oxide of 1 through 7%, and a total amount of the last three components is 10 through 20%, all by weight,
    and suppresses its light transmittance of a wavelength of 400 nm or less substantially to zero, in a glass thickness of 2 mm or more, and at the same time, forms an absorption peak of the light transmittance at a wavelength of 510 through 540 nm.

9. The driving glasses as set forth in claim 8,
    wherein a photo chromic portion whose light transmittance automatically varies in response to irradiation of light at the short wavelength side of a visible range is provided continuously from said polarizing film.

10. The driving glasses as set forth in claim 2, wherein said functional layer displays a function of reflecting thermic rays.

11. The driving glasses as set forth in claim 2, wherein an anti-reflection layer is formed on the inner surface of said glass matrix.

12. The driving glasses as set forth in claim 1,
    wherein contents of neodymium oxide and praseodymium oxide are 5 through 7% and 2 through 5% by weight respectively, and their content ratio is 2:1 through 1.5:1.

13. The driving glasses as set forth in claim 1,
    wherein said glass matrix further contains silicon oxide of 35 through 70%, boron oxide of 2 through 10%, barium oxide of 2 through 12%, sodium oxide and/or potassium oxide of 10 through 25%, and stibium oxide of 0 through 1%, all by weight.

14. The driving glasses as set forth in claim 13,
    wherein said glass matrix further contains zinc oxide of 0.05 through 3%, cerium oxide of 0.1 through 2%, and nickel oxide of 0.05 through 3%, all by weight.

15. The driving glasses as set forth in claim 2, wherein said glass matrix contains neodymium oxide of 2 through 5% by weight.

16. The driving glasses as set forth in claim 2, wherein said glass matrix further contains silicon oxide of 35 through 70%, boron oxide of 2 through 10%, barium oxide of 2 through 12%, sodium oxide and/or potassium oxide of 10 through 25%, and stibium oxide of 0 through 1%, all by weight.

17. The driving glasses as set forth in claim 16, wherein said glass matrix further contains copper oxide of 0.01 through 0.12%, and manganese dioxide of 0.1 through 1%, all by weight.

* * * * *